United States Patent
Stiesdal

(10) Patent No.: US 11,952,922 B2
(45) Date of Patent: Apr. 9, 2024

(54) OPERATION OF A THERMAL ENERGY STORAGE SYSTEM

(71) Applicant: Stiesdal Storage A/S, Give (DK)

(72) Inventor: Henrik Stiesdal, Odense (DK)

(73) Assignee: Stiesdal Storage A/S, Give (DK)

(*) Notice: Subject to any disclaimer, the term of this patent is extended or adjusted under 35 U.S.C. 154(b) by 0 days.

(21) Appl. No.: 18/090,687

(22) Filed: Dec. 29, 2022

(65) Prior Publication Data

US 2023/0133239 A1 May 4, 2023

Related U.S. Application Data

(63) Continuation of application No. PCT/DK2021/050185, filed on Jun. 10, 2021.

(30) Foreign Application Priority Data

Jun. 29, 2020 (DK) .............. PA 2020 70423

(51) Int. Cl.

| | |
|---|---|
| *F01K 3/02* | (2006.01) |
| *F01K 3/12* | (2006.01) |
| *F01K 7/16* | (2006.01) |
| *F02C 1/10* | (2006.01) |
| *F02C 6/14* | (2006.01) |
| *F28D 20/00* | (2006.01) |

(52) U.S. Cl.
CPC ............ *F01K 3/02* (2013.01); *F01K 3/12* (2013.01); *F01K 7/16* (2013.01); *F02C 1/10* (2013.01); *F02C 6/14* (2013.01); *F28D 20/0056* (2013.01); *F05D 2220/31* (2013.01); *F05D 2260/42* (2013.01); *Y02E 20/14* (2013.01)

(58) Field of Classification Search
CPC ..... F01K 3/02; F01K 3/12; F01K 7/16; F02C 1/10; F02C 6/14; F28D 20/0056; F05D 2220/31; F05D 2260/42; Y02E 20/14
USPC .................. 60/650, 659, 682–684
See application file for complete search history.

(56) References Cited

U.S. PATENT DOCUMENTS

| | | | |
|---|---|---|---|
| 2010/0301614 A1 | 12/2010 | Ruer | |
| 2015/0218968 A1* | 8/2015 | Sinatov | F01K 3/18 60/659 |
| 2015/0260463 A1* | 9/2015 | Laughlin | F01K 13/02 165/104.31 |
| 2018/0187597 A1 | 7/2018 | Apte et al. | |

FOREIGN PATENT DOCUMENTS

| | | |
|---|---|---|
| CN | 110206600 A | 9/2019 |
| WO | 2019013898 A1 | 1/2019 |

* cited by examiner

*Primary Examiner* — Hoang M Nguyen
(74) *Attorney, Agent, or Firm* — Elevated IP, LLC

(57) ABSTRACT

Operation of an energy storage system comprising a thermodynamic cycle including first and second thermal reservoirs and a turbomachinery as energy converter for two-way conversion between electrical energy and thermal energy. For controlling the temperature in the system, the compression ratio of the turbomachinery is adjusted in real-time during charging on the basis of temperature measurements downstream of the compression and/or during discharging on the basis of temperature measurements downstream of the expansion.

18 Claims, 4 Drawing Sheets

OPERATION OF A THERMAL ENERGY STORAGE SYSTEM

CROSS-REFERENCE TO RELATED APPLICATIONS

This application is a continuation under 35 U.S.C. 111 of International Patent Application No. PCT/DK2021/050185, filed Jun. 10, 2021, which claims the benefit of and priority to Danish Application No. PA 2020 70423, filed Jun. 29, 2020, each of which is hereby incorporated by reference in its entirety.

FIELD OF INVENTION

The present disclosure relates to a method of operating an energy storage system comprising hot and cold thermal reservoirs for two-way conversion between electrical and thermal energy by means of compression and expansion of gas circulating in the hot and cold thermal reservoirs.

BACKGROUND

The energy production costs of wind power and solar photovoltaic power are already now at grid parity in many parts of the world; in many areas of the world it is even the cheapest solution when installing new energy capacity. Hence, depending on local resources it is expected that within a few years wind power and/or solar photovoltaic power will be competitive with all conventional energy sources, in particular fossil fuel sources. In spite thereof the variability of wind power and solar photovoltaic power sets an upper limit to the penetration of these renewable energy sources into the electrical system.

Consequently, if renewable energy sources like wind power and solar photovoltaic power are to replace fossil fuel sources to the extent required to meet the climate change mitigation targets, then longer-term electricity storage to smooth out supply variability will be an inevitable part of the solution. Hence, electricity storage will be a key aspect of the energy transition.

Presently no viable storage solution exists that has sufficient capacity and can be deployed without severe topographical, geological and/or cost constraints, and which can provide cost-effective storage at the capacity levels required to solve this problem. Fossil fuel powered systems are therefore often required as back-up for renewable energy systems. In order to mitigate fossil fuel dependency, cost-efficient storage technologies with capacities measured in days, weeks or months are necessary.

For electricity release times on the order of seconds to minutes, a number of high-power, low capacity storage options are available, including ultra-capacitors, superconducting coils, and flywheels. Due to their short duration, these options are largely irrelevant for the large-scale integration of renewables, except for transient recovery. For release times in the range of minutes to a few hours, electrochemical batteries typically offer the best economy. However, when release times exceed a few hours and the energy capacity requirements increase correspondingly, the specific costs of capacity become dominant over the specific cost of charge/discharge, and electrochemical batteries become uneconomical. This leaves pumped hydro, hydrogen, Compressed Air Energy Storage (CAES) and thermal storage as the only options. Due to the topographical and/or geological constraints of pumped hydro, hydrogen and CAES, thermal electricity storage is the only realistic option for large-scale, high-penetration integration of renewable energy systems.

Pumped-heat storage is a variant of thermal electricity storage. In a pumped-heat storage system, a reversible gas compression and expansion system is used to store energy as a temperature difference between two thermal reservoirs: a hot reservoir and a cold reservoir. To store electricity, i.e. to "charge" the storage system, electrical power is fed to an electric motor driving a heat pump, which pumps heat from the cold reservoir to the hot reservoir (similar to the operation of a refrigerator). To recover the stored energy, i.e. to "discharge" the storage system, a heat engine is used to convert the stored heat into mechanical work and drive a generator, feeding electric power back to the grid.

The benefit of the heat pump is that the Coefficient of Performance (COP) for the conversion of electricity into heat is higher than 100%. At the same time, the cold that is created as a function of the heat pump arrangement is also stored and is used to improve the efficiency of the heat engine during discharge. As a consequence, the total round-trip efficiency of a pumped-heat storage system can be as high as 60% or even more.

In order to obtain economic deployment of pumped-heat thermal energy storage in grid-scale electricity networks, it is necessary to carefully optimize size, reservoir temperature range and heat pump operation when balancing robustness, volume manufacturing and in particular thermodynamic efficiency of the energy transfer.

Useful systems relate to a pumped-heat energy storage system comprising a hot thermal reservoir, having a hot end and a cold end, and a cold thermal reservoir having a hot end and a cold end. In order to increase the thermodynamic efficiency, turbomachinery is necessary in the gas compression and gas expansion stages of the energy conversion. Hence, turbomachinery is provided that is connected to the hot and cold ends of the hot and cold thermal reservoirs for two-way conversion between electrical and thermal energy by means of compression and expansion of gas circulating in the hot and cold thermal reservoirs.

Examples of energy storage systems are disclosed in WO2019/013898 and CN110206600.

US2018/0187597 discloses an energy storage system with gas as a working fluid that circulates through the system for moving heat between two sets of liquid thermal storage systems, in particular molten salt tanks. For optimization, the compression ratio in the charging cycle is different from the compression ratio in the discharging cycle. Examples for the shift of the compression ratio when changing from charge to discharge includes change of the rotation speed of the compressor, variable stator pressure control, bypassing a subset of the compression or expansion stages on charge or discharge by the use of valves, or using different dedicated compressor/turbine combinations for charge and discharge mode, respectively.

Using different compressor/turbine combinations for charge and discharge mode is disclosed in US2010/301614, where it has been recognized that the need for compression and expansion is different for the charging cycle as compared to the discharging cycle, and accordingly, two different compressor/expander sets have been provided for the charging cycle and the discharging cycle, respectively. The installation for storing and returning electrical energy in US2010/301614 comprises first and second enclosures through which the working fluid is circulated in compressed and expanded state, respectively. During charging, compression of the gas is increasing its temperature, and the thermal energy of the gas is then transferred to refractory porous material in the first enclosure. When the gas is leaving the top end of the second enclosure on its way to the compressor, it is heated by a heater to a pre-determined temperature T2, which prior to normal operation has been pre-adjusted to a fixed value in the range of 400° C.-1000° C. and exemplified as 600° C. Once, the gas has reached this predetermined temperature of 600° C., it enters the compressor and is compressed with a temperature increase to a predetermined temperature T1, which prior to normal operation has been pre-adjusted to a fixed value within the range of 1200° C.-1400° C. and exemplified as 1300° C. The pre-adjustment of the temperature T1 is made prior to normal operation by adjusting the motor that drives the compressor for charging. As the inlet temperature T2 for the compressor is pre-adjusted to a pre-determined fixed value, for example 600° C., the motor and compressor always run at the same speed during normal operation. Similar to the fixed temperatures between the inlet and the outlet of the compressor, also the temperatures upstream and downstream of the turbine, exemplified as T0=20° C. and T3=−50° C., are pre-determined and fixed. In order to keep T0 fixed, heat exchange with the environment is used. Once, pre-adjusted, the temperatures at the inlets and outlets of the compressors and expanders remain fixed not only in the charging period but also in the discharging period. Only one component is real-time adjusted during normal operation, namely a heater upstream of the compressor during charging to maintain the temperature of 600° C. at the inlet of the compressor. The system in US2010/301614 has an advantage in that it is simple to operate and stable in normal operation, seeing that only the heater has to be real-time adjusted, which is accomplished by measuring the temperature of the gas at the entrance of the heater and heating it the remaining degrees up to 600° C. before the gas enters the compressor. As the temperatures upstream and downstream of the compressors and expanders remain fixed in the circuit after the initial pre-adjustment, the pre-adjusted motor speed during charging and the generator speed during discharging also remain fixed during normal operation. However, although, the heater solves the problem for having a stable system, the system disadvantageously implies such additional component.

It would be desirable to reduce the number of components in the prior art but maintain the advantages and provide further advantages with respect to flexibility of operating energy storage systems.

BRIEF DESCRIPTION

It is an objective of the invention to provide an improvement in the art. In particular, it is an objective to minimize the number of necessary components while maintaining a high efficiency in a thermal energy storage system where gas as a working fluid is used to move thermal energy between a first and second thermal reservoir during alternating charge and discharge cycles.

This and further objectives are fulfilled by a method of operating an energy storage system, as explained in more detail below, which comprises a thermodynamic cycle including first and second thermal reservoirs and a turbomachinery as energy converter for two-way conversion between electrical energy and thermal energy. For controlling the temperature in the system, the compression ratio of the turbomachinery is adjusted in real-time during charging on the basis of temperature measurements downstream of the compression and/or during discharging on the basis of temperature measurements downstream of the expansion.

A method of operating an energy storage system is presented, which comprises a thermodynamic cycle including first and second thermal reservoirs and a turbomachinery as energy converter for two-way conversion between electrical energy and thermal energy. For controlling the temperature in the system, the compression ratio of the turbomachinery is adjusted in real-time on the basis of temperature measurements downstream of the compression during charging and/or downstream of the expansion during discharging.

In the following, the term hot thermal reservoir is used for the first thermal reservoir and the term cold thermal reservoir for the second thermal reservoir for indicating that the temperature in the first reservoir is higher than in the second reservoir. This is a commonly used terminology in the field, in particular also in the above-mentioned references US2018/0187597 and US2010/301614. Similarly, the terms "hot end" and "cold end" will be used for ends where the first end has a higher temperature than the second end.

In contrast to US2010/301614, no heater is used upstream of the compressor but the compression pressure ratio of the compressor is variably adjusted in real time during the charging cycle and/or during the discharge cycle while the system is in normal standard operation. The term "normal standard operation" has to be understood as the continuous long-term operation with repeated energy storage after commissioning of the system, once an initial setup adjustment of the system has been finalized. The variable adjustment of the compression ratio is done during charging as a response to changes in the temperature as measured by a temperature gauge.

For example, the adjustment of the compression ratio is done in order to compensate for temperature drops in the gas from the hot end of the cold thermal reservoir during a charging cycle. The adjustment of the compression ratio, thus, is used as an alternative to a heater, which reduces the number of necessary components in the circuit.

Such adjustment of the compression ratio is also useful for varying the temperature in the hot thermal reservoir, for example in order to store more energy when the price for electricity is low.

For optimized efficiency, it is important to control the temperature of the thermal reservoir. Control of this temperature and thereby control of the coefficient of performance, COP, of the energy storage system is achieved by carefully controlling the operation of the turbomachinery, in particular the compressor-turbine, motor-generator and drive unit combination that is configured to vary the compression ratio of the turbomachinery.

Various mechanisms are available for such adjustment of the pressure ratio. During charging, a possible measure for adjusting the pressure ratio through the compressor is a real time variation of the rotational speed of the compressor, typically done by varying the speed of the electrical motor that drives the compressor. The speed is varied as a response to temperature variations in the gas on the downstream side of the compressor, for example at the outlet of the compressor or in the hot end of the hot thermal reservoir.

Whereas the system in US2010/301614 measures the temperature upstream of the compressor and adjusts the heater as a response to the temperature variation in the gas upstream of the compressor during charging, the system as described herein measures the temperature downstream of the compressor and adjusts the compression ratio for the compressor in order to adjust the outlet temperature.

Advantageously, a feedback loop is used, involving a temperature gauge for a real time temperature feedback to a controller, for example measuring the actual temperature of the gas that exits the compressor or the temperature in the hot end of the thermal reservoir, and the controller is used to control the speed of the motor in real time on the basis of the real-time temperature measurement. Optionally, the controller is configured to increase the speed until the predetermined temperature at the outlet of the compressor has been reached, which is then typically the temperature of the gas entering the hot end of the hot thermal reservoir.

As explained below, adjustment of the compression ratio can also be used to adjust the temperature of the gas in accordance with expected and/or estimated developments of parameters relevant for the operation, such as environmental temperature changes or price level variations for electricity. For example, if it is estimated that the pricing level will be low within a certain period in the near future, the compression adjustment is performed shortly in advance in order to fully exploit the beneficial low-price period for energy storage.

Whereas the system in US2010/301614 bases the temperature adjustment on the gas temperature at the exit of the cold thermal storage, the system as described herein bases the temperature adjustment on a desired temperature at the entrance into the hot thermal storage. The latter is a different approach and provides a higher degree of freedom for adjustment as well as higher precision. As already mentioned, it may be desirable to vary the temperature of the hot thermal storage in dependence on the pricing of the available electrical energy, and the system has a feedback loop that varies the compression to the desired outlet temperature. In US2010/301614, this is not possible, as the inlet temperature for the compressor is fixed. Also, a feedback loop with temperature gauge downstream of the compressor is not provided in US2010/301614, which is why a controlled real time variation of the compressor outlet temperature is not possible.

As explained, by such control, it is possible to control the temperature of the hot end of the hot thermal reservoir during charging of the energy storage system. However, additionally, or alternatively, it is possible to control the temperature of the hot end of the cold thermal reservoir during discharging of the energy storage system. In this case, the pressure ratio of the expander that drives the generator for recovery of the stored energy is potentially adjusted, which due to the gas cycle being closed, also determines the overall compression ratio of the entire turbomachinery, especially seeing that an expander and a compressor are used in the cycle both during charging and discharging.

The present disclosure further relates to a method for optimizing the round-trip efficiency of a pumped-heat thermal energy storage system.

The thermal energy storage system comprises
a hot thermal reservoir having a hot end and a cold end, where the hot end of the hot thermal reservoir has a higher temperature T1, for example in the range of 450° C. to 600° C., than the cold end of the hot thermal reservoir, for example having a temperature T1' in the range of 50° C. to 150° C.;
a cold thermal reservoir having a hot end and a cold end, where the hot end of the cold thermal reservoir has a higher temperature T2, for example in the range of 200° C. to 400° C., than the cold end of the cold thermal reservoir, which typically has sub-zero temperature, for example having a temperature T2' in the range of −50° C. to −5° C., although it is also possible to have a temperature slightly above the freezing point, such as in the range up to 25° C.;
and turbomachinery connected to the hot and cold ends of the hot and cold thermal reservoir for two-way conversion between electrical and thermal energy by means of compression and expansion of gas circulating within the hot and cold thermal reservoirs.

Details to the connection are explained below.

As mentioned, the hot end of the hot thermal reservoir has a higher temperature T1 than the temperature T2 at the hot end of the cold thermal reservoir, and the cold end of the hot thermal reservoir has a higher temperature T1' than the temperature T2' at the cold end of the cold thermal reservoir. Furthermore, under normal operation conditions, the hot end of the cold reservoir has a higher temperature than the cold end, yielding the relationship T2'<T1'<T2<T1.

The optimization method comprises the steps of varying the compression ratio during charging of the energy storage system to control the temperature of the hot end of the hot thermal reservoir, and/or varying the compression ratio during discharging of the energy storage system to control the temperature of the hot end of the cold thermal reservoir.

In practical embodiments, the hot thermal reservoir comprises a first thermal energy storage (TES) medium and the cold thermal reservoir comprise a second thermal energy storage (TES) medium, which are typically gravel, for example crushed basalt rock. By motor-driven compression during charging of the system, the gas attains a higher temperature and transfers thermal energy to the first TES medium. By expansion through an expander, which drives an electrical generator, during discharge, thermal energy is transferred from the first TES medium to the circulating gaseous working fluid, the temperature of which is decreased by expansion in the turbine, and some of the remaining energy is transferred to the second TES medium while the gas traverses the cold thermal reservoir.

During the charging method, gas as a working fluid, typically air, is circulating
from the cold end of the cold thermal reservoir through the second TES medium and to the hot end of the cold thermal reservoir, heating the gas from T2' to T2,
then through a motor-driven charge-compressor for raising the temperature of the gas further to T1,
then through the hot end of the hot thermal reservoir and through the first TES medium to the cold end of the hot thermal reservoir, for thermal energy transfer to the first TES medium, where the gas temperature reduces from T1 to T1'
then through a charge-expander, reducing the temperature to T2', and back to the cold end of the cold reservoir.

During the discharging method, the gas is circulating
from the cold end of the hot thermal reservoir through the first TES medium and to the hot end of the hot thermal reservoir, heating the gas from T1' to T1,
then through a discharge-expander that is driving an electrical generator reducing the temperature to T2,
then through the hot end of the cold thermal reservoir and through the second TES medium to the cold end of the cold thermal reservoir, reducing the temperature from T2 to T2',
then through a discharge-compressor, raising the temperature to T1', and back to the cold end of the hot reservoir.

The temperature levels are idealized for explaining the principle. However, in practice, there are some pressure drops through the reservoirs, which have to be compensated for. And if a thermocline flattens and the process is run until the gas at the end the thermal reservoir deviates from the set temperature, such changes have to be taken into account. However, as the compression ratio is adjustable in real time during charge and discharge, such compensation can be implemented in the adjustment of the compression ratio and the correspondingly resulting gas temperatures.

Optionally, the charge-compressor/expander and the discharge-compressor/expander are the same, and the gas flow path through the compressor/expander is changed when switching from charging to discharging. However, due to the different compression and expansion requirements for charging relative to discharging, the expander/compressor combination used during charging is not necessarily identical to the expander/compressor combination used in the discharging cycle, as also discussed above in relation to the corresponding discussion in the prior art. In particular, the required capacity of the expander in the charging cycle is less than the necessary capacity of the expander turbine during the discharging, when energy has to be recovered through the generator. Also, the compressor in the discharging cycle needs less capacity than the compressor in the charging cycle. Switching between multiple compressors and expanders is advantageous in order to optimize the system. A similar discussion is found in US2010/301614 and US2018/0187597. Typically, however, for such systems, the compressor and expander in a combination are connected by a common rotational shaft.

It is important to control one or both of the hot ends of the thermal reservoirs with respect to temperature, because these temperatures are a key aspect in obtaining and maintaining an efficient energy conversion in the energy storage system.

In order to optimize the round trip efficiency of the gas, a target temperature is pre-determined for the first, hot end of the first, hot reservoir for a specific charging cycle. During this specific charging cycle, the optimization includes repeatedly, for example continuously or in intervals, measuring a temperature of the gas after compression but before transfer of thermal energy from the gas to the first TES medium and varying the compression ratio of the turbomachinery in real time on the basis of the temperature measurement during charging of the energy storage system. This way, the temperature of the hot end of the hot thermal reservoir can be varied in a controlled way to reach the target temperature.

As an option, similarly, a target temperature is predetermined for the first, hot end of the second, cold reservoir for a specific discharging cycle. During this specific discharging cycle, the optimization includes repeatedly, for example continuously or in intervals, measuring a temperature of the gas after expansion but before transfer of thermal energy from the gas to the second TES medium, and varying the compression ratio of the turbomachinery in real time on the basis of the temperature measurement during discharging of the energy storage system. This way, the temperature of the hot end of the cold thermal reservoir can be varied in a controlled way to reach the target temperature.

In practice over many charging cycles, the predetermined target temperatures are repeatedly changing from one charging cycle to a subsequent charging cycle in order for different charging cycles to have different predetermined target temperatures. The compression ratio is then varied correspondingly from one charging cycle to the subsequent charging cycle, and potentially also during the charging cycle.

It is emphasized that this repeated adjustment from charging cycle to charging cycle is in contrast to US2010/301614, in which a pre-adjustment was made during commissioning, the temperature adjustment of which was then kept constant for all following charging cycles during normal operation.

In some embodiments, the target temperature of the hot end of hot thermal reservoir, advantageously, is the maximum attainable temperature of the thermal storage.

A way to control these hot end temperatures is to control the compression ratio in the turbomachinery by means of real-time variable-speed compression by the compressor and/or real-time variable-speed turbo-expansion by the expander turbine.

As an alternative to changing the rotational speed of the motor-driven compressor, it is possible to provide a compressor with position-variable or orientation-variable inlet vanes and then use these inlet vanes to adjust the compression ratio, especially within a charging cycle and during charging.

The fact that the compression ratio is adjusted within and during charging is in contrast to US2018/0187597, for which it was discussed above that the adjustment was only done between charging and discharging cycles due to the different requirements in the charging cycle relative to the discharging cycle.

By adjusting the compression ratio, the temperature of the gas leaving the compressor can be adjusted to the predetermined target temperature. Typically, the system is designed to a maximum gas temperature, for example for protecting equipment against overheating or due to a limitation of the compressor capacity, and if the target temperature is the maximum achievable gas temperature, this specific gas temperature may be selected for operation. However, if the target temperature is lower than the maximum achievable temperature, a higher gas temperature than the target temperature may in certain cases be used for a period in order to increase the temperature of the hot end of the hot thermal reservoir quickly, and once the target temperature in the hot end of the hot reservoir has been reached, the gas temperature may be adjusted to the target temperature by adjusting the compression ratio.

As an example and already indicated above, in the charging cycle, the compression of the gas is adjusted to reach a gas temperature in the range of 450° C. to 600° C. upstream of the first thermal reservoir. This range is useful for material, such as steel, which is commonly used for the pipes and containers, and which can withstand such temperatures but which imply a risk for failure at higher temperatures.

The expander is typically adjusted to expand the gas downstream of the first thermal reservoir to a temperature in the range of −50° C. to −5° C.

As an example, for the discharging cycle, the expansion of the gas upstream of the second thermal reservoir is adjusted to a temperature in the range of 200° C. to 400° C., and the compression adjusted for the gas upstream of the first thermal reservoir to have a temperature in the range of 50° C. to 150° C.

The presently disclosed energy storage system can be realized with suitably designed turbomachinery, storage tanks with packed rock beds, e.g. crushed basalt rock as TES material, and adequate feedback control loops between temperature and turbomachinery. The presently disclosed solution can be realized cost-efficiently without use of flammable, toxic substances or scarce resources, such as lithium, vanadium or other elements and with very limited environmental impact. The low-cost energy storage solution as presently disclosed can be combined with wind and solar power to become the cheapest sources of reliable, on-demand electrical energy, thereby facilitating much higher renewable energy penetration than currently possible, resulting in fossil fuel reduction and large potential for climate change mitigation.

Gas peaking power plants are an example of a commercially available solution for supplementing variable renewable energy. A typical gas peaker plant has a net efficiency of around 30% and a specific cost of around $1,000,000 per MW. The presently disclosed energy storage system is expected to have net efficiency of around 60% and a specific cost of around $500,000 per MW, i.e. providing not only a carbon free power system, but also a cheaper power system compared to renewables backed up by gas power.

BRIEF DESCRIPTION OF THE DRAWINGS

The invention will, in the following, be described in greater detail with reference to the accompanying drawings:

FIG. 1A illustrates a charging operation and FIG. 1B illustrates a discharging operation.

DETAILED DESCRIPTION

Figure 1A:
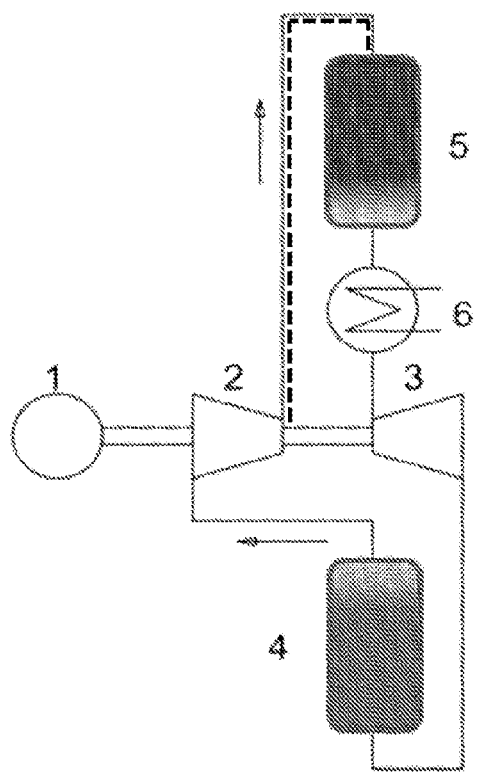
FIGS. 1A-1B are diagrammatic exemplary representations of the presently disclosed pumped-heat storage system, where
Figure 1B:
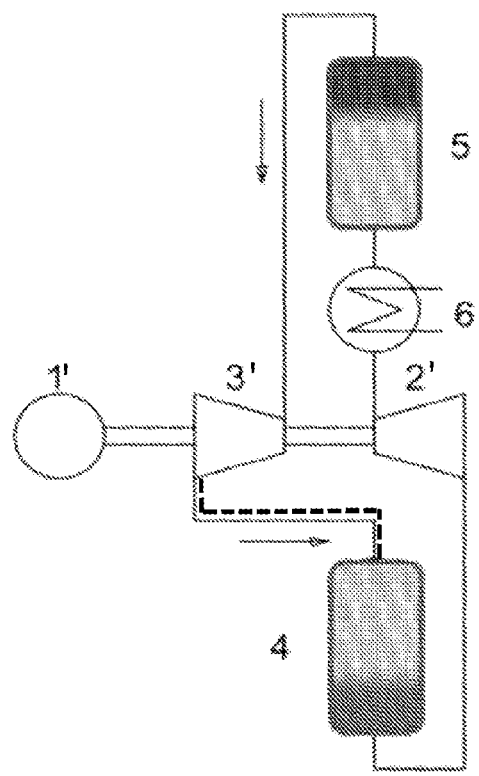

FIGS. 1A-B show diagrammatic exemplary representations of the presently disclosed pumped-heat storage system, where FIG. 1A illustrates a charging operation and FIG. 1B illustrates a discharging operation.

During charging in FIG. 1A, a motor 1 drives a compressor 2. The working fluid, such as dry air or dry $CO_2$, is heated by adiabatic compression in the compressor 2 and subsequently flows through a hot thermal reservoir 5. Here, the working fluid transfers most of its heat to a first TES medium, for example packed rock bed, of the hot thermal reservoir 5 during its flow from the hot end to the cold end. For example, the hot end has a temperature T1 in the range of 450° C. to 600° C., and the cold end of the hot thermal reservoir has a temperature T1' in the range of 50° C. to 150° C.

The gas, as a working fluid, is then pre-cooled in a cooler 6 and further cooled, typically to sub-zero temperature, through adiabatic expansion in a turbine 3. Optionally, the temperature downstream of the turbine 3 is in the range of T2' in the range of −50° C. to 25° C., although typically in the range of −50° C. to −5° C.;

The working fluid subsequently absorbs heat from a second TES medium, for example packed rock bed, of a cold reservoir 4 before again entering the compressor 2. This process is a heat pump cycle, for example with a Coefficient of Performance COP in the order of 340% at 600° C. maximum temperature.

During discharging in FIG. 1B, the flow direction through the reservoirs 4, 5 is reversed, and the resulting process is comparable to a Brayton cycle similar to a gas turbine cycle, although there may be pressure losses in the reservoirs 4,5 as well as thermocline flattening, which influence the cycle so that it deviates from an ideal cycle.

The gas flow through the combination of compressor 2' and expander 3' is different during discharging because an expander 3' is now connected to the hot end of the hot thermal reservoir 5 and a compressor 2' to the cold end of the hot thermal reservoir 5. Although, in principle, it is possible to use the same compressor and expander in the charging as in the discharging cycle, it can be advantageous to use a different combination of compressor 2' and expander 3' for discharging than the combination of compressor 2 and expander 3 for charging because the compression during charging requires more capacity than during discharging, and the expansion during discharging has to release the stored energy, which is in contrast to the expansion during charging which is subject to lower forces from the gas.

A general discussion of switching the pressure ratio when going from charging to discharging is found in US2018/0187597 and achieved by changing to a different set of compressor/expander when switching from charging to discharging.

With reference to FIG. 1B, hot air from the hot thermal reservoir 5 is expanded in the gas turbine 3', which drives a generator 1' to generate electricity. A portion of the remaining heat of the working fluid, for example air, is transferred to the second TES medium in the cold thermal reservoir 4 during passage from the hot end to the cold end of the cold thermal reservoir 4. From there, the working fluid is heated by compression in compressor 2' and further heated through passage from the cold end, through the first TES medium to the hot end of the hot thermal reservoir 5.

Typically, a charging cycle or discharging cycle is stopped when the thermocline region approaches or reaches the end of the corresponding reservoir.

In some cases, the discharge efficiency is on the order of 20%, optionally leading to a total thermodynamic roundtrip efficiency on the order of 67%. When considering unavoidable pressure losses, thermal gradients, and motor/generator and power converter losses, the net round-trip efficiency can be around 60%.

The cooler 6 is provided to dissipate system losses. The presently disclosed system can be designed such that waste heat from the cooler 6 exits at a temperature of approximately 75° C., which is perfectly suited for pre-heating in district heating systems or in the heating systems of large institutions. Consequently, a second revenue stream in relation to heating will become available in addition to the primary revenue stream related to electricity.

A key aspect in optimization of the roundtrip efficiency of the presently disclosed energy storage system is control of the compression ratio of the turbomachinery, because the compression ratio of the turbomachinery affects the efficiencies of the compressor and the expander turbine and couples directly to a number of parameters in the thermodynamic processes. Improving the compressor efficiency from 85%, which is a typical maximum for open impellers, to 90% is possible for custom-designed, shrouded impellers, and this greatly improves thermodynamic round-trip efficiency of the present approach.

It has turned out to be particularly important to control and/or keep the hot end of one or both of the thermal reservoirs within a predefined temperature range. Hence, there is advantageously a feedback between measuring a temperature representing the hot end of one or both of the thermal reservoirs and the compression ratio of the turbomachinery. Hence, the presently disclosed energy storage system is advantageously configured to vary the compression ratio in response to a measured temperature representing the temperature of the hot end of the hot thermal reservoir and/or the temperature of the hot end of the cold thermal reservoir.

For example, if a predetermined temperature in the hot end of the hot thermal reservoir is desired constant, but the temperature upstream of the compressor is decreasing, the compression ratio of the compressor is increased in the charging phase, for example by increasing the speed of the driving motor, in order to maintain the temperature at the outlet of the compressor despite decreasing temperature at the inlet of the compressor.

The temperature representing the hot end of hot thermal reservoir during charging can be measured at one or more locations along the process. For example, this temperature can be measured at the outlet from the compressor stage, an advantage of that is that the feedback regulation to the compressor is very fast. But due to heat loss, the temperature at the exit side of the compressor does not necessarily represent the true temperature at the hot end of the hot thermal reservoir. Another (or an additional) option is to measure the temperature inside the hot thermal reservoir, i.e. at the hot end of the hot thermal reservoir, or just at the inlet to the hot end of the hot thermal reservoir. Alternatively or additionally the temperature representing the hot end of hot thermal reservoir during charging can be measured anywhere on the fluid connection between the compressor outlet (as indicated with a stippled line in FIG. 1A) and the hot end inlet, but the most likely locations are the compressor outlet or the hot end inlet.

Correspondingly, the temperature representing the hot end of the cold thermal reservoir during discharging can be measured at one or more locations along the process indicated with a stippled line in FIG. 1B. For example, this temperature can be measured at the outlet from the turbo-expander stage, with a fast real-time feedback regulation of the turbo-expander as an advantage. Another (or an additional) option is to measure the temperature inside the cold thermal reservoir, i.e. at the hot end of the cold thermal reservoir, or just at the inlet to the hot end of the cold thermal reservoir.

In that regard, the compression ratio during charging may be varied in real time or optionally programmed with a predetermined delay in order to achieve a target temperature of the hot end of the hot thermal reservoir, given the actual temperature of the hot end of the cold reservoir during charging. Correspondingly and/or alternatively, the compression ratio during discharging may be varied to achieve a target temperature of the hot end of the cold thermal reservoir, given the actual temperature of the hot end of the hot reservoir during discharging.

In a further embodiment the presently disclosed energy storage system is configured to calculate and/or predict a predicted change in temperature of the hot end of the hot thermal reservoir, and/or the hot end of the cold thermal reservoir, over a predefined period. The change in temperature may be resulting from heat loss, thermocline changes and/or other factors. These would affect the temperature of the first end of the first thermal reservoir and/or the temperature of the hot end of the cold thermal reservoir in the event that the compression ratio would not be adjusted. However, a compensation is achieved by adjustment of the compression ratio in order to counteract the predicted change.

Following this calculation and prediction, the compression ratio of the turbomachinery can be varied in response to said change in temperature and a corresponding measured temperature representing the temperature of the hot end of the hot thermal reservoir and/or the temperature of the hot end of the cold thermal reservoir. In that regards the compression ratio may be varied during charging to reach a specific target temperature after said specific time. Optionally, in addition, the temperature at the cold end of the hot thermal reservoir and/or the temperature of the cold end of the cold thermal reservoir is taken into account.

It should be emphasized that the energy storage is most important in the case of surplus energy in the electricity grid, for example because of high production of electricity by wind turbines at times when the consumption is low, for example a stormy summer day. For such events, it may be advantageous to use low-priced electricity for a quick charging, for example. Accordingly, a change in electricity pricing may be predicted or otherwise recorded, and the compression ratio potentially increased to a higher level when the electricity price is lower than when the electricity price is higher, for example relative to a predetermined pricing level. The maximum allowable operating temperature is another key aspect in optimizing the overall round-trip efficiency of the presently disclosed approach. A typical maximum allowable operating temperature for industrial equipment is around 500° C. But with advanced, but reasonably machinable, steel types it is possible to elevate the maximum allowable operating temperature from 500° C. to around 600° C., which has a potential to improve net round-trip efficiency from about 54% to about 60%.

Figure 2:
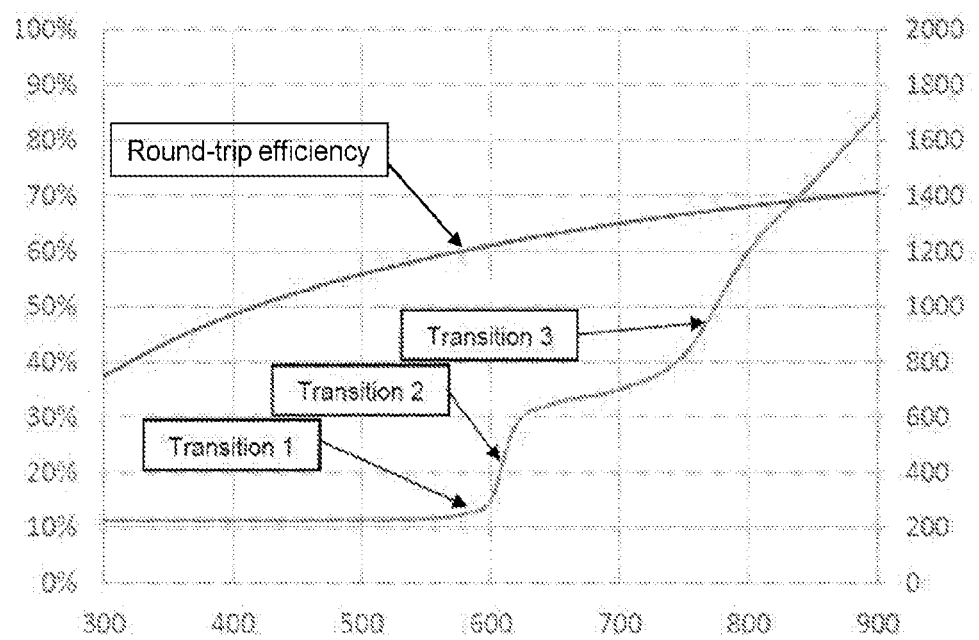
FIG. 2 is a diagram showing the relationship between Round-Trip Efficiency (RTE) on the left Y-axis and Cost of Power on the right Y-axis vs. the temperature of the hot end of the hot thermal reservoir.

In principle, it is possible to increase thermodynamic round-trip efficiency even further by going to higher temperatures than 600° C. FIG. 2 shows the effect of increased temperatures on net round-trip efficiency and cost of the power equipment (e.g. the compressor-turbine unit, the power converter, the transformer, etc.) as a function of maximum operating temperature. A first transition towards higher costs occurs at around 550° C. when it is no longer possible to use ordinary steel types and high-temperature steels will be required. A second pronounced transition towards higher costs occurs above 600° C. when it is no longer possible to use steel. Here, super-alloys (e.g. Inconel) will be required. Inconel is both expensive and difficult to machine, pressure-hardening when cut, and these factors lead to a step-change in cost. A third transition occurs above 750° C. when it is no longer possible to use superalloys. Here, ceramics or mono-crystalline materials will be required, with additional increases in cost. This implies that economic deployment of the presently disclosed approach would not be possible. Given the upwards convex shape of the efficiency curve, with limited efficiency gains resulting from the large increases in cost, the temperature range of 550° C. to 600° C. is useful for the hot end of the hot thermal reservoir during charging. For example, 550° C., 575° C. or 600° C., of the hot end of the hot thermal reservoir during charging of the energy storage system has been reasonably selected as the target temperature of the presently disclosed approach.

The thermal reservoirs can be filled with materials such as rock, gravel, molten salts, or water which are abundant and inexpensive and pose no threat to the environment. In advantageous embodiments of the presently disclosed energy storage system, the hot and/or the cold thermal reservoir comprise(s) a packed rock bed.

In particular, when using gravel as a TES medium, the gas can be in direct contact with the gravel, whereas in the case of liquid, the gas has to be led through the liquid by pipes with a heat exchange through the pipe material.

The working fluid in the storage system can be a noble gas, such as argon. However, the working fluid in the presently disclosed approach is typically air or $CO_2$, in particular dry air or dry $CO_2$ which is a more cost-efficient solution compared to noble gases.

Method

As stated above the present disclosure further relates to a method for optimizing the round-trip efficiency of a pumped-heat thermal energy storage system comprising a hot thermal reservoir having a hot end and a cold end, a cold thermal reservoir having a hot end and a cold end, and turbomachinery connected to the hot and cold ends of the hot and cold thermal reservoirs for two-way conversion between electrical and thermal energy by means of compression and expansion of gas circulating in the hot and cold thermal reservoirs, i.e. an energy storage system such as the presently disclosed pumped-heat thermal energy storage system. A method comprises the steps of varying the compression ratio during charging of the energy storage system to control the temperature of the hot end of the hot thermal reservoir, and/or varying the compression ratio during discharging of the energy storage system to control the temperature of the hot end of the cold thermal reservoir.

As stated above a key aspect in optimization of the roundtrip efficiency is control of the compression ratio of the turbomachinery, which can be varied by means of variation of the rotational speed of one or more compressors and/or expanders.

The compression ratio may be varied in response to a combination of a measured temperature representing the temperature of the hot end of the hot thermal reservoir and/or the temperature of the hot end of the cold thermal reservoir, and a predicted change over a specific time of the temperature of the hot end of the hot thermal reservoir and/or the temperature of the hot end of the cold thermal reservoir resulting from heat loss, thermocline changes and/or other factors affecting the temperature of the hot end of the hot thermal reservoir and/or the temperature of the hot end of the cold thermal reservoir.

Accordingly, the compression ratio may be varied to reach a specific target temperature after said specific time.

The presently disclosed method may be applied to the presently disclosed pumped-heat thermal energy storage system.

Modularization

A way towards economic deployment of the presently disclosed approach is industrialization and modularization. One example of modularization in the energy sector is found within wind power. A modern 100 MW onshore wind farm does not comprise one single 100 MW wind turbine, but 25-50 identical wind turbines, each of 2-4 MW rating, i.e. the wind farm is modularized. Another example of modularization is that 100 MW solar photovoltaic power farm does not comprise one single 100 MW solar panel, but 400,000 identical solar panels, each of 0.25 kW rating. Based on the industrialized and modularized approach, both onshore wind farms and solar photovoltaic power farms can be implemented in single-season projects, using lean technologies and a largely unskilled labor force.

The presently disclosed energy storage can correspondingly be implemented as a set of parallel, identical power units, each fitted with a set of parallel, identical reservoir tanks, where a thermal reservoir as used herein is an assembly of a plurality of interconnected reservoir tanks. The desired power rating of the energy storage system determines how many power units will be required, and the desired release time determines how many reservoir tanks will be required for each power unit.

For example, a standard reservoir cylindrical reservoir tank can be provided with diameter of around 4 m and a height of around 12 m. One such unit can hold about 20 MWh of thermal energy. This unit size is ideally suited for manufacturing in wind turbine tower factories and can be easily transported by truck on all relevant markets. The dimensions are also within the allowed profile for railway transportation in the USA.

Hence, in an embodiment of the present disclosure the cold thermal reservoir and/or the hot thermal reservoir comprises a plurality of interconnected thermal reservoir units, usually identical thermal reservoir units. Each of said interconnected thermal reservoir units may be configured such that it can store less than 100 MWh of thermal energy, less than 50 MWh of thermal energy, less than 25 MWh of thermal energy, or between 15 and 25 MWh of thermal energy.

To facilitate the use of normal steel types for the reservoirs, or at least advanced, but reasonably machinable, steel types, the thermal reservoirs/thermal reservoir units can be insulated internally, ensuring that the circumference of the reservoirs is maintained at roughly ambient temperature.

Turbomachinery

The utilization of turbomachinery is a key aspect in the presently disclosed approach as part of optimizing the round-trip efficiency. The annual production of low-rating turbochargers for automobiles is well over 100 million units, i.e. perfect for low-cost deployment but with a rating and efficiency which is unsuitable for the present approach. At the other end of the scale approx. 100 high-rating large gas turbines are produced, i.e. perfectly suited for high rating and high efficiency operation but unsuitable for cost efficient deployment of the presently disclosed energy storage system.

The relationship between thermodynamic efficiency and power rating of a compressor turbine turns out to be strongly upwardly convex, and round-trip efficiencies in the range of 60%, for the present use, are reached at a 1 MW rating. At this rating, the annual production volume of compressors and impellers is on the order of 5000, i.e. within a mass production/industrialization approach. Such a power rating also fits within the presently applied modularization approach, i.e. power units having power ratings of 1-5 MW will provide the desired optimal trade-off between robustness, volume manufacturing and thermodynamic efficiency.

An embodiment of the presently disclosed energy storage system therefore comprises at least one integrated power unit comprising a motor or generator and at least one compressor and/or turbine, which may be directly connected to the motor/generator shaft. The energy storage system may consequently comprise a plurality of said integrated power units, each power unit having a power rating of less than 10 MW, for example, 1-5 MW.

In order to improve control of the thermodynamic process, the turbomachinery may advantageously comprise multi-stage compression and/or multi-stage expansion stages, typically configured such that the rotational speed of at least one compression and/or expansion stage can be varied independently of at least one other compression and/or expansion stage.

EXAMPLES

Figure 3:
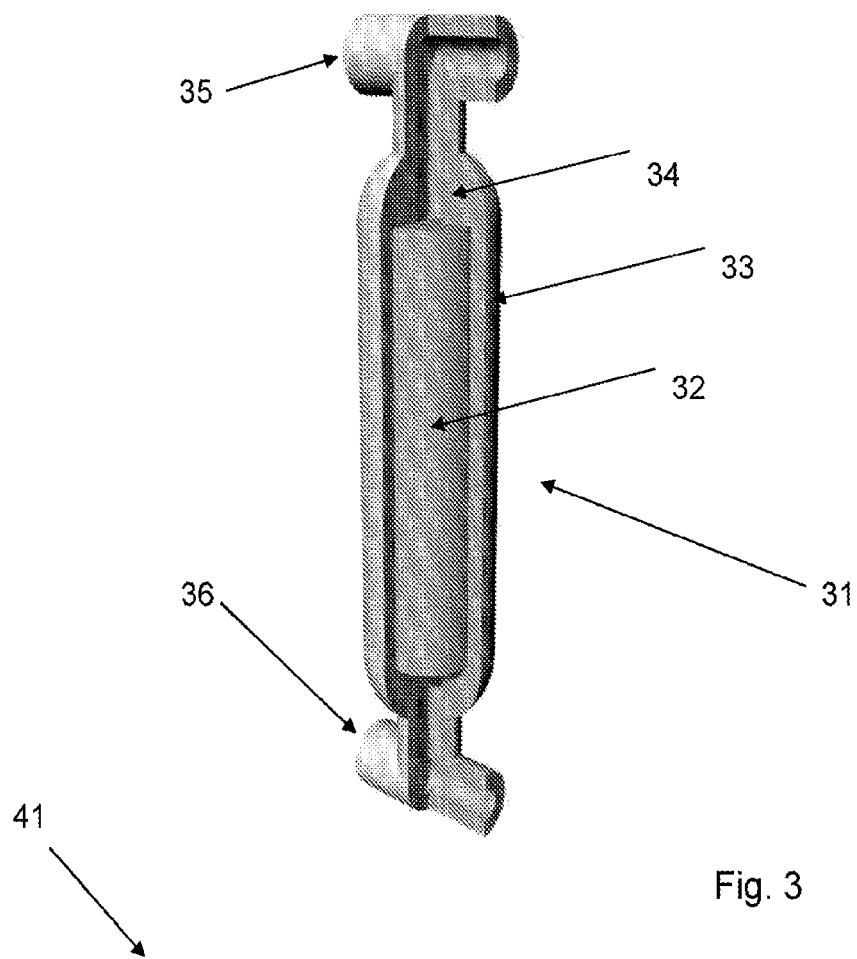
FIG. 3 shows an example of a single thermal reservoir.
Figure 4:
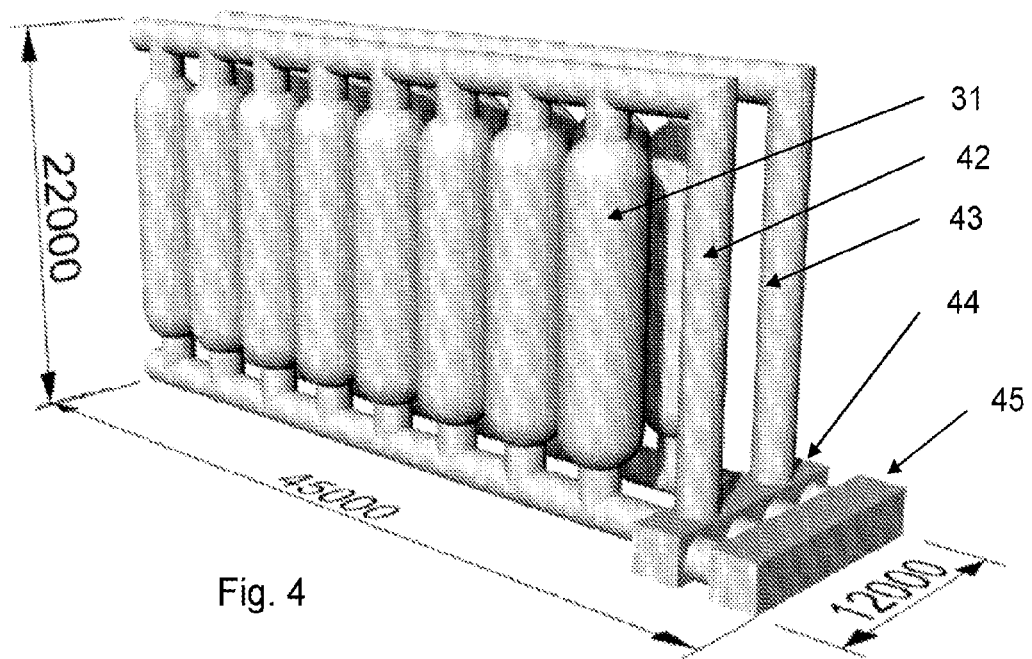
FIG. 4 shows an example of the presently disclosed energy storage system in the form of a 2.5 MW, 60 MWh system.

FIG. 3 shows an example of a single thermal reservoir which can function as a hot or cold thermal reservoir or as a single thermal reservoir unit 31 among a plurality of thermal reservoir units, as illustrated in FIG. 4. The thermal reservoir unit 31 comprises an outside tank, for example steel tank 33, with a packed rock bed 32 in the form of crushed basalt rock as the thermal energy storage (TES) medium surrounded by an insulation layer 34, which makes use of standard steel possible, even if the maximum target temperature of the hot thermal reservoir is 600° C. Feeder pipes 35, 36 for inlet/outlet of gas are provided at the hot end and cold end of the thermal storage unit. The feeder pipes 35, 36 are also provided with an insulation layer 34.

FIG. 4 shows an example of the presently disclosed modularized pumped-heat thermal energy storage system 41 comprising sixteen thermal reservoir units 31 in two rows, eight hot thermal reservoirs and eight cold thermal reservoirs, i.e. well-defined reservoir units suited for industrialized manufacturing. A hot feeder pipe 42 distributes the "hot" gas between the eight hot thermal reservoirs and the common turbomachinery 45 and a cold feeder pipe 43 distributes the "cold" gas between the eight cold thermal reservoirs and the common turbomachinery 45. A filter unit 44 with air filters and manifolds is provided between the feeder pipes 42, 43 and the turbomachinery 45 to ensure that only clean air enters the turbomachinery 45, which comprises a number of parallel turbo units with turbo-expander, pre-pressure compressor, controls etc. With the exemplified dimensions, the entire energy storage system 41 in FIG. 4 can be housed in a standard 40-foot container for easy transport. As seen from FIG. 4 the modularity provides for easy scaling of storage duration and power rating. Storage duration is adjusted with the number of thermal reservoirs and the power rating is adjusted with the number of parallel turbo units. The turbomachinery in FIG. 4 has a power rating of 2.5 MW and the thermal reservoir has a thermal storage capacity of 60 MWh, which is suitable for prototype demonstration, which can deliver a clean energy storage system offering storage capacities in the range from 18-24 hours, for day-to-day smoothing of solar photovoltaic power, to 3-7 days for smoothing of wind power over gaps, e.g. caused by frontal passages.

Figure 5:
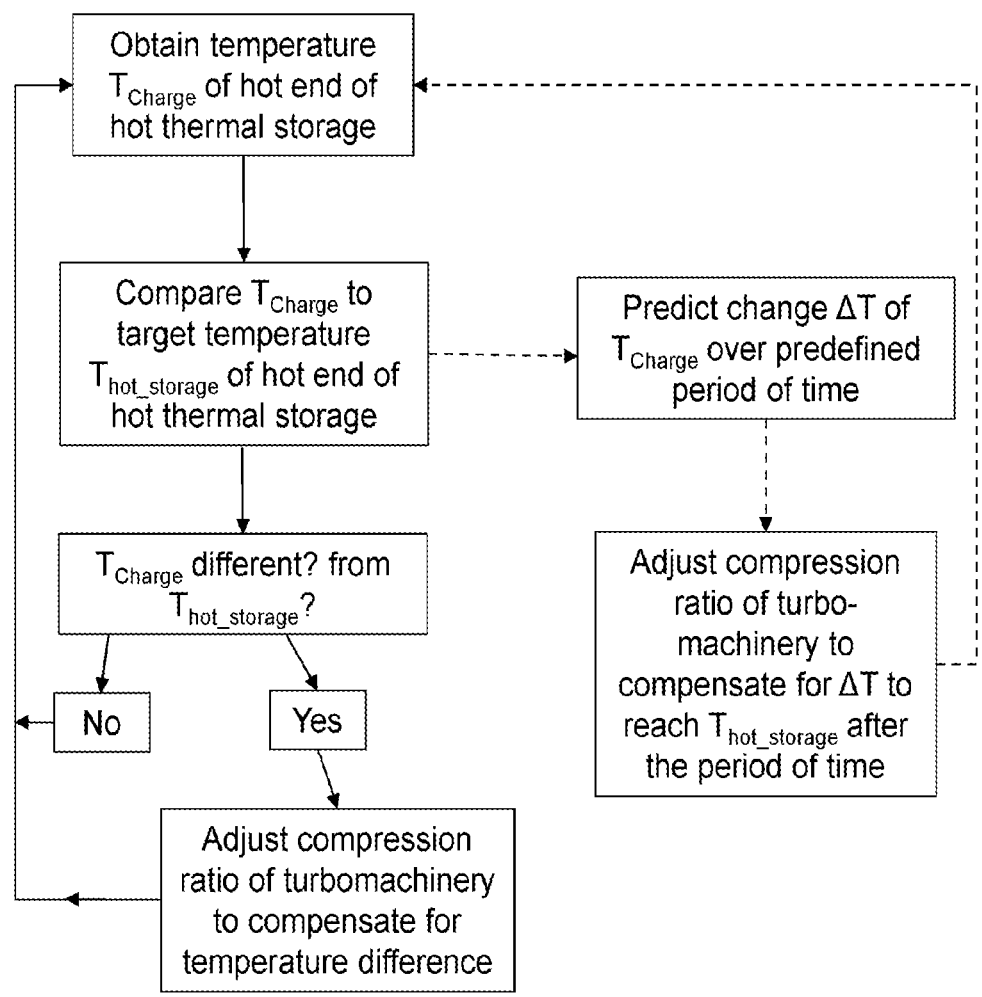
FIG. 5 shows an embodiment of process control feedback during charging of the presently disclosed energy storage system.

FIG. 5 shows an embodiment of process control feedback during charging of the presently disclosed energy storage system. A real-time temperature $T_{Charge}$ representing the hot end of the hot thermal storage is obtained continuously or at intervals, for example regular intervals. Measurement of this temperature is made with a corresponding temperature gauge and is explained above. The system and the hot thermal storage have been designed for a maximum temperature and the target temperature of the hot end of the hot thermal storage $T_{hot\_storage}$ is typically this maximum temperature. The control feedback compares the measured real time value $T_{Charge}$ to the target temperature $T_{hot\_storage}$, and if they are outside predefined acceptance ranges, the compression ratio of the turbomachinery, in this case the compressor stage, is adjusted, e.g. by varying the rotational speed of the impeller, to compensate for the difference between the measured $T_{Charge}$ and the target temperature $T_{hot\_storage}$.

For adjustment of the compression ratio, stators in the turbomachinery components can be movable and be moved as necessary to adjust the temperature by compression. As a further alternative, variable inlet guide vanes may be arranged for adjusting the compression ratio. As the inlet guide vanes are located at the compressor inlet, these vanes change the direction of the velocity by which the gas is entering the impeller, so that by a change of the angle at which these vanes direct the flow at the impeller, the capacity can be adjusted, and thus also the compression ratio.

As also illustrated in FIG. 5 the basic feedback control loop can optionally be refined if time-varying temperature variations are considered, e.g. heat loss, thermocline changes, present and future weather parameters, and electricity prices. In a well-designed system, these temperature changes can be predicted and thereby provide for a more stable and long-term temperature compensation and turbomachinery control. In some situations, instead of immediate adaptation of temperature differences between measured and target temperatures, the compression ratio of the turbomachinery is adjusted such that $T_{hot\_storage}$ can be reached after a predefined period of time, for example the period of time wherein the temperature change has been predicted or the onset of price reduction for electricity. Also in this case, it is necessary to follow the actual temperature $T_{Charge}$ in real time in order to provide a controlled temperature adjustment.

Figure 6:
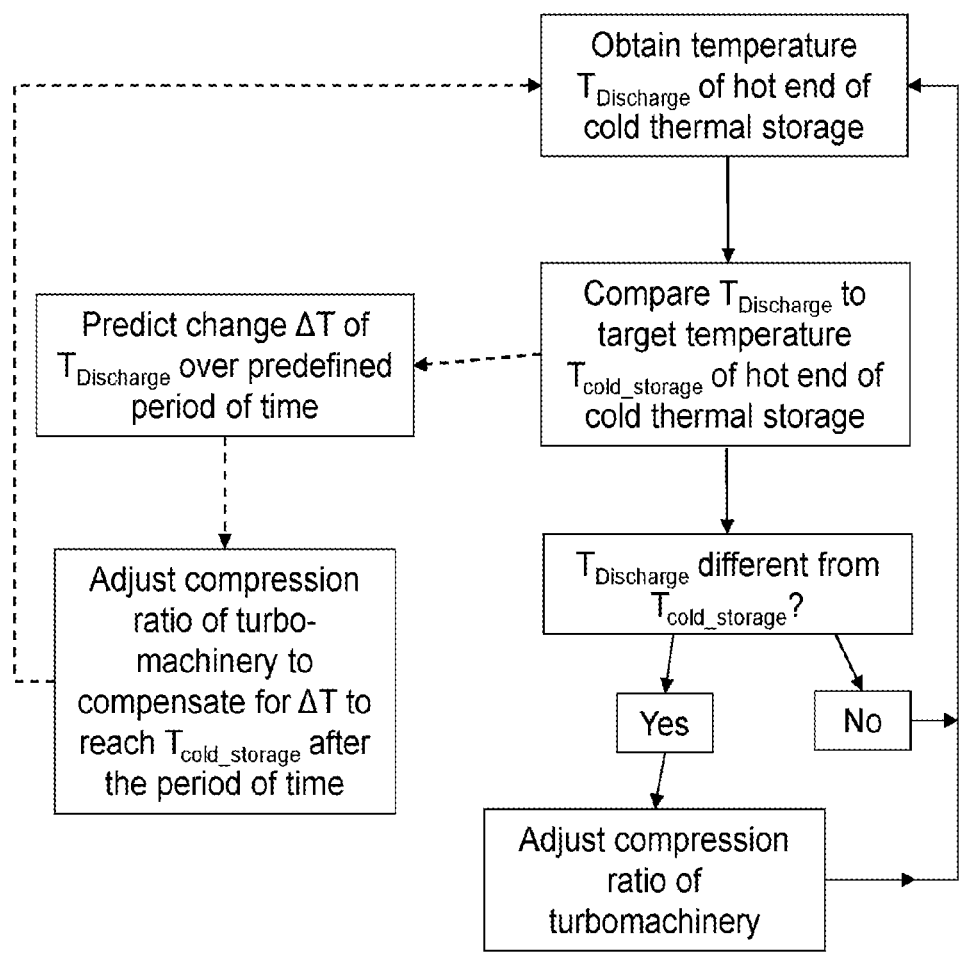
FIG. 6 shows an embodiment of process control feedback during discharging of the presently disclosed energy storage system.

FIG. 6 shows an embodiment of process control feedback during discharging of the presently disclosed energy storage system. FIG. 6 is quite similar to FIG. 5, but as also explained herein the measured temperature is a temperature $T_{cold\_storage}$ representing the hot end of the cold thermal storage and the target temperature is the hot end of the cold thermal storage. And as also discussed herein the presently disclosed approach is particularly efficient if $T_{cold\_storage}$ is determined by $T_{hot\_storage}$. This implies that the design of the energy storage system determines the maximum operational temperature of the hot thermal storage, which thereby determines the hot end of the cold thermal storage. These two target temperatures provide for maximum efficiency setpoints during both charging and discharging of the system— and these setpoints can be controlled by varying the compression ratio of the turbomachinery during both charging and discharging.

Further Details Defined as Aspects

In the following, a number of interrelated features are defined as aspects.

Aspect 1. A pumped-heat thermal energy storage system comprising a hot thermal reservoir having a hot end and a cold end, a cold thermal reservoir having a hot end and a cold end, and turbomachinery connected to the hot and cold ends of the hot and cold thermal reservoirs for two-way conversion between electrical and thermal energy by compression and expansion of gas circulating in the hot and cold thermal reservoirs, wherein the energy storage system comprises a compressor-turbine, motor-generator and drive unit combination that is configured to vary the compression ratio of the turbomachinery to control the temperature of the hot end of the hot thermal reservoir during charging of the energy storage system and/or to control the temperature of the hot end of the cold thermal reservoir during discharging of the energy storage system.

Aspect 2. The energy storage system according to Aspect 1, wherein the energy storage system is configured to vary the compression ratio by variation of the rotational speed of the turbomachinery, such as variation of the rotational speed of one or more compressors and/or expanders of the turbomachinery.

Aspect 3. The energy storage system according to any of the preceding Aspects, wherein the turbomachinery comprises multi-stage compression and/or multi-stage expansion stages, configured such that the rotational speed of at least one compression and/or expansion stage is varied independently of at least one other compression and/or expansion stage.

Aspect 4. The energy storage system according to any of the preceding Aspects, configured such that the compression ratio of the turbomachinery is varied in response to a measured temperature representing the temperature of the hot end of the hot thermal reservoir and/or the temperature of the hot end of the cold thermal reservoir.

Aspect 5. The energy storage system according to any of the preceding Aspects, configured to calculate a predicted change in temperature of the hot end of the hot thermal reservoir and/or the hot end of the cold thermal reservoir, over a predefined period, the change in temperature resulting from heat loss, thermocline changes and/or other factors, and varying the compression ratio of the turbomachinery in response to said predicted change in temperature and the corresponding measured temperature representing the temperature of the hot end of the hot thermal reservoir and/or the temperature of the hot end of the cold thermal reservoir.

Aspect 6. The energy storage system according to any of the preceding Aspects, configured to vary the compression ratio to reach a specific target temperature after said predefined period, the target temperature typically representing the temperature of the hot end of the hot thermal reservoir and/or the temperature of the hot end of the cold thermal reservoir.

Aspect 7. The energy storage system according to any of the preceding Aspects, wherein a target temperature of the hot end of the cold thermal reservoir during discharging is defined by the target temperature of the hot end of the hot thermal reservoir during charging.

Aspect 8. The energy storage system according to any of the preceding Aspects, wherein the hot and/or the cold thermal reservoir comprises a packed rock bed.

Aspect 9. The energy storage system according to any of the preceding Aspects, wherein the working fluid is air or $CO_2$. Optionally, the cold thermal reservoir and/or the hot thermal reservoir comprises a plurality of interconnected thermal reservoir units.

Aspect 10. The energy storage system according to any of the preceding Aspects, wherein the energy storage system has at least one integrated power unit comprising a motor or generator and at least one compressor and/or turbine directly connected to the motor/generator shaft.

Aspect 11. The energy storage system according to Aspect 10, wherein the energy storage system comprises a plurality of integrated power units, each power unit having a power rating of less than 10 MW, for example 1-5 MW.

Aspect 12. The energy storage system according to any of the preceding Aspects, wherein the energy storage system comprises multi-stage compression and/or expansion stages, and where the rotational speed of at least one compression and/or expansion stage can be varied independently of at least one other compression and/or expansion stage.

Aspect 13. The energy storage system according to any of the preceding Aspects, wherein the cold thermal reservoir and/or the hot thermal reservoir comprises a plurality of interconnected thermal reservoir units.

Aspect 14. The energy storage system according to Aspect 13, wherein each of said interconnected thermal reservoir units is configured to store less than 100 MWh of thermal energy.

Aspect 15. The energy storage system according to any of the preceding Aspects, wherein a target temperature of the hot end of the hot thermal reservoir during charging of the energy storage system is at least 550° C., or at least 575° C., or at least 600° C.

Aspect 16. A method for optimizing the round-trip efficiency of a pumped-heat thermal energy storage system comprising a hot thermal reservoir having a hot end and a cold end, a cold thermal reservoir having a hot end and a cold end, and turbomachinery connected to the hot and cold ends of the hot and cold thermal reservoirs for two-way conversion between electrical and thermal energy by compression and expansion of gas circulating through the hot and cold thermal reservoirs, comprising the steps of varying the compression ratio during charging of the energy storage system to control the temperature of the hot end of the hot thermal reservoir, and/or varying the compression ratio during discharging of the energy storage system to control the temperature of the hot end of the cold thermal reservoir.

Aspect 17. The method of Aspect 16, wherein the compression ratio is varied by variation of the rotational speed of one or more compressors and/or expanders.

Aspect 18. The method of any of Aspects 16-17, wherein the energy storage system comprises multi-stage compression and/or expansion stages, and wherein the rotational speed of at least one compression and/or expansion stage is varied independently of at least one other compression and/or expansion stage.

Aspect 19. The method of any of Aspects 16-18, wherein the compression ratio is varied in response to a measured temperature representing the temperature of the hot end of the hot thermal reservoir and/or the temperature of the hot end of the cold thermal reservoir, and wherein optionally a target temperature of the hot end of the cold thermal reservoir during discharging is defined by a target temperature of the hot end of the hot thermal reservoir during charging.

Aspect 20. The method of any of Aspects 16-19, wherein the compression ratio is varied in response to a combination of a measured temperature representing the temperature of the hot end of the hot thermal reservoir and/or the temperature of the hot end of the cold thermal reservoir, and a predicted change over a specific time of the temperature of the hot end of the hot thermal reservoir and/or the temperature of the hot end of the cold thermal reservoir resulting from heat loss, thermocline changes and/or other factors affecting the temperature of the hot end of the hot thermal reservoir and/or the temperature of the hot end of the cold thermal reservoir.

Aspect 21. The method of any of Aspects 16-20, wherein the compression ratio is varied to reach a specific target temperature representing the hot end of the hot thermal reservoir and/or the hot end of the cold thermal reservoir after said specific time.

Aspect 22. The method of any of the preceding Aspects, wherein the pumped-heat thermal energy storage system is the energy storage system of any of the Aspects 1-15.

What is claimed is:
1. A method of operating a thermal energy storage system having:
   a gas as a working fluid;
   a first thermal reservoir having a first end and a second end, the first end of the first thermal reservoir having a temperature higher than the second end of the first thermal reservoir; the first thermal reservoir containing a first thermal energy storage medium for exchanging thermal energy with the gas during flow of the gas through the first thermal reservoir;

a second thermal reservoir having a first end and a second end, the first end of the second thermal reservoir having a temperature higher than the second end of the second thermal reservoir, and the first end of the second thermal reservoir having a temperature lower than the first end of the first reservoir; the second thermal reservoir containing a second thermal energy storage medium for exchanging thermal energy with the gas during flow of the gas through the second thermal reservoir;

turbomachinery connected to the first and second ends of the first and second thermal reservoirs and configured for two-way conversion between electrical and thermal energy by compression and expansion of the gas circulating through the first and second thermal reservoirs; and a drive unit and a motor driving a compressor of the turbomachinery during charging of the thermal energy storage system and a generator driven by an expander turbine of the turbomachinery during discharging of the thermal energy storage system;

the method comprising:

during charging, raising the temperature of the gas by motor-driven compression when the gas is flowing from the first end of the second thermal reservoir to the first end of the first thermal reservoir;

during discharging, reducing the temperature of the gas by expansion when the gas is flowing from the first end of the first thermal reservoir to the first end of the second reservoir; and one or more of (i) predetermining a first target temperature for the first end of the first thermal reservoir for a specific charging cycle; during the specific charging cycle, repeatedly measuring the temperature of the gas after compression but before transfer of thermal energy from the gas to the first thermal energy storage medium; and varying a compression ratio of the turbomachinery in real time based on the temperature measurement during charging of the energy storage system for controlling the temperature of the first end of the first thermal reservoir and reaching the first target temperature; and (ii) predetermining a second target temperature for the first end of the second thermal reservoir for a specific discharging cycle; during the specific discharging cycle, repeatedly measuring the temperature of the gas after expansion but before transfer of thermal energy from the gas to the second thermal energy storage medium; and varying the compression ratio of the turbomachinery in real time based on the temperature measurement during discharging of the energy storage system for controlling the temperature of the first end of the second thermal reservoir and reaching the second target temperature.

2. The method according to claim 1, further comprising repeatedly changing the first and/or the second predetermined target temperature from one charging cycle to a subsequent charging cycle such that different charging cycles have different predetermined target temperatures.

3. The method according to claim 2, further comprising adjusting the compression ratio from one charging cycle to the subsequent charging cycle, thereby using different compression ratios in different charging cycles.

4. The method according to claim 1, further comprising adjusting the compression ratio from one charging cycle to a subsequent charging cycle, thereby using different compression ratios in different charging cycles.

5. The method according to claim 1, wherein varying the compression ratio of the turbomachinery in real time during charging comprises changing a rotational speed of the motor driving the compressor.

6. The method according to claim 5, wherein varying the compression ratio of the turbomachinery in real time during charging comprises adjusting inlet guide vanes of the compressor.

7. The method according to claim 1, wherein varying the compression ratio of the turbomachinery in real time during charging comprises adjusting inlet guide vanes of the compressor.

8. The method according to claim 1, further comprising increasing the compression ratio within a charging cycle in real time to compensate for a decrease in the temperature of the gas.

9. The method according to claim 1, wherein the thermal energy storage system lacks an electrical heater in a flow path of the gas between the first end of the second thermal reservoir and the compressor.

10. The method according to claim 1, further comprising predicting a change in temperature of the first end of the first thermal reservoir and/or the temperature of the first end of the second thermal reservoir over a predefined period due to prediction factors that would affect the temperature of the first end of the first thermal reservoir and/or the temperature of the first end of the second thermal reservoir if the compression ratio would not be adjusted.

11. The method according to claim 10, further comprising varying the compression ratio to counteract the predicted change.

12. The method according to claim 10, wherein the prediction factors include at least one of predicted heat loss and predicted thermocline change.

13. The method according to claim 1, further comprising, for the charging cycle, adjusting compression of the gas to reach a gas temperature in a range of 450° C. to 600° C. upstream of the first thermal reservoir.

14. The method according to claim 13, further comprising adjusting the expander turbine to expand the gas downstream of the first thermal reservoir to a temperature in a range of −50° C. to −5° C.

15. The method according to claim 1, further comprising, for the discharging cycle, adjusting expansion of the gas to reach a temperature in a range of 200° C. to 400° C. upstream of the second thermal reservoir.

16. The method according to claim 15, further comprising adjusting compression of the gas upstream of the first thermal reservoir to a temperature in a range of 50° C. to 150° C.

17. The method according to claim 1, further comprising determining an electricity price and adjusting the compression ratio to a higher value when the electricity price is lower than a predetermined pricing level and to a lower value when the electricity price is higher than a predetermined pricing level.

18. The method according to claim 1, further comprising:
generating electrical energy using a wind turbine or solar power plant;
using the electrical energy to drive the motor and store a portion of the electrical energy as thermal energy in the thermal energy storage system, during a charging cycle; and
converting the thermal energy into kinetic energy that drives the generator and produces new electrical energy.

* * * * *